United States Patent [19] [11] 4,061,222
Rushing [45] Dec. 6, 1977

[54] WEB TRACKING APPARATUS

[75] Inventor: Allen J. Rushing, Webster, N.Y.

[73] Assignee: Eastman Kodak Company, Rochester, N.Y.

[21] Appl. No.: 696,960

[22] Filed: June 17, 1976

Related U.S. Application Data

[63] Continuation-in-part of Ser. No. 594,396, July 9, 1975, abandoned.

[51] Int. Cl.² ............................................. B65G 15/64
[52] U.S. Cl. ..................................... 198/807; 74/242; 226/23
[58] Field of Search ....................... 226/23, 21, 22, 19, 226/20; 242/57.1; 74/242; 198/807, 806

[56] References Cited

U.S. PATENT DOCUMENTS

| 1,186,906 | 6/1916 | Hopkins | 242/57.1 |
| 2,716,026 | 8/1955 | Axworthy | 226/21 |
| 3,078,021 | 2/1963 | Crownfield et al. | 226/21 |
| 3,698,540 | 10/1972 | Jordan | 198/806 |
| 3,806,013 | 4/1974 | McCann | 226/19 |

Primary Examiner—Bruce H. Stoner, Jr.
Attorney, Agent, or Firm—John D. Husser

[57] ABSTRACT

Apparatus for automatically tracking an endless belt or web of material in a stable, predetermined path of movement despite changes in the belt configuration due to differential belt stretching or the introduction into the machine of a new belt having a slightly different configuration. The apparatus includes a steering roller supported for rotational movement about the longitudinal central axis and tilting movement about an axis perpendicular to the longitudinal axis. In one embodiment, a steering roller control signal is produced by comparing the magnitude of the weighted sum of voltage signals representative of the lateral belt edge position and the tilted roller position with the magnitude of the integrated sum of the lateral belt edge position signal and a command signal representative of the desired lateral belt edge position. In a second embodiment, the steering roller control signal is produced by comparing the magnitude of the weighted sum of voltage signals representative of the lateral belt edge position and the instantaneous lateral belt deviation rate with the magnitude of the command signal representative of the desired lateral belt edge position.

9 Claims, 4 Drawing Figures

WEB TRACKING APPARATUS

CROSSREFERENCE TO RELATED APPLICATIONS

This is a continuation-in-part of my earlier filed application, Ser. No. 594,396 filed on July 9, 1975, now abandoned.

BACKGROUND OF THE INVENTION

1. Field of the Invention

The present invention relates to belt tracking apparatus and, more particularly, to apparatus for tracking an endless belt in a stable, equilibrium lateral position despite changes in belt configuration.

2. Description of the Prior Art

As is well-known, if the longitudinal axis of rotation and the outer surface of a roller are exactly parallel, then a belt or web of material approaching the roller in a direction perpendicular to the axis of rotation will continue to follow the same path of movement about the roller surface until the web is disturbed. However, in normal operation, the outer surface of the roller is not exactly parallel to the axis of rotation and the web does not approach the roller exactly perpendicular to its outer surface. As a result of this misalignment, the web will shift laterally along the roller, tracing a spiral path on the roller surface until it is approaching the roller in a perpendicular manner. Lateral movement of a web along the outer surface of a guide roller can also be caused by uneven tension across the width of the web, web camber or web hydroplaning at high translational speeds.

A simple way to track a web of material along a predetermined path of movement is to provide the rollers with a flange at each end which mechanically forces the web to run between the flanges. However, since the web still tends to travel in the direction it would if the flanges were not there, this tracking technique produces concentrated loading at the edges of the web, resulting in excessive wear and a tendency for the web to climb the flanges, causing deformation and creasing of the web edge.

Another well-known web tracking technique utilizes crown rollers. Such rollers force the web in toward the apex of the roller, resulting in a bulge in the web surface as it conforms to the shape of the crown roller. This tracking technique is, therefore, inappropriate when the web must be guided through the mechanism in a flat condition.

In still another well-known tracking technique, provision is made to detect the position of a lateral edge of the web and to tilt a web steering roller angularly in either of two opposite directions from a normal or neutral position when a deviation is sensed. A disadvantage of this tracking technique is that the web position oscillates with significant amplitude both laterally and normally to the belt plane as the web continuously moves back and forth between two limits. To stabilize the web tracking, a feedback signal representative of the tiltable web steering roller position can be included in the control mechanism, as described in U.S. Pat. No. 2,716,026 to Axworthy. In Axworthy's device, a first signal representative of the lateral position of a web and a second signal representative of a tiltable web steering roller position are compared with a command signal representative of the desired lateral web position. Whenever the magnitude of the sum of the first and second signals deviates from the command signal by a predetermined amount, a control signal activates an electromechanical mechanism which tilts the steering roller so as to direct the web back to the desired tracking position.

However, in the tracking of endless belts or webs of material, additional position-disturbing forces are produced by imperfect belt splicing or by splices in which one end stretches differentially relative to the other and by the introduction into the machine of a new belt having a slightly different configuration. Thus, if the shape of an endless belt were changed in a control system such as in the Axworthy patent, the feedback signal representative of the steering roller position would have a non-zero value at the previous equilibrium tracking position. This means that, with a fixed command signal, the Axworthy device would, within predetermined limits, track an endless belt in a stable equilibrium position, but that such equilibrium position would change with each change in belt shape.

In certain applications, it is desirable to track an endless belt or web of material in the same path of movement regardless of the above described changes in belt configuration. For example, in an automatic electrophotographic copying apparatus wherein an endless photoconductive belt is repeatedly driven past a plurality of processing stations, deviation in belt position adversely affects operations at various stations along the belt path, e.g., the uniform charging pf the photoconductive surface, the proper alignment of the projected original image onto the belt and the subsequent transfer of the developed image onto a support material.

SUMMARY OF THE INVENTION

It is, therefore, an object of the present invention to provide improved tracking of an endless belt along a predetermined path despite changes in the belt's configuration or the introduction of a new belt of slightly different configuration onto the path.

Another object of the invention is to provide an apparatus with the aforementioned capability that is of simple design and yet thoroughly efficient and reliable in operation.

These and other objects and advantages are accomplished in accordance with the present invention by a tiltable belt steering roller whose position is continually adjusted so that the belt is maintained at a single, stable, equilibrium position despite changes in the belt shape. The necessary adjustment is determined by control circuitry which processes signals representative of the lateral belt edge position, the desired belt edge position and either the steering roller position or the instantaneous lateral belt deviation rate to produce a control signal which is applied to a gear motor that controls the tilt position of the belt steering roller. In the preferred embodiments, the lateral belt position signal is filtered to reduce corrective positioning of the steering roller in response to an imperfectly slit and/or spliced belt. Safeguards are also provided to maintain the belt steering roller within a predetermined normal operating range.

The invention advantageously provides repeated belt tracking in the same path of movement for belts of changing or different configuration with fairly rapid and well-damped steering roller adjustments whenever the command signal is changed or belt position-disturbing forces are produced.

The invention, its objects and its advantages will become more apparent to those skilled in the art by referring to the accompanying drawings and to the ensuing detailed description of the preferred embodiment which follows.

DETAILED DESCRIPTION OF THE PREFERRED EMBODIMENT

To aid the understanding of the present invention, the operation of an automatic electrophotographic copying machine wherein the invention is particularly useful will be briefly described. It is to be understood, however, that the apparatus of the present invention could be used with equal facility and advantage in other belt tracking operations and, therefore, that the following description of apparatus related to but not forming part of the invention is provided for illustrative purposes only.

Figure 1:
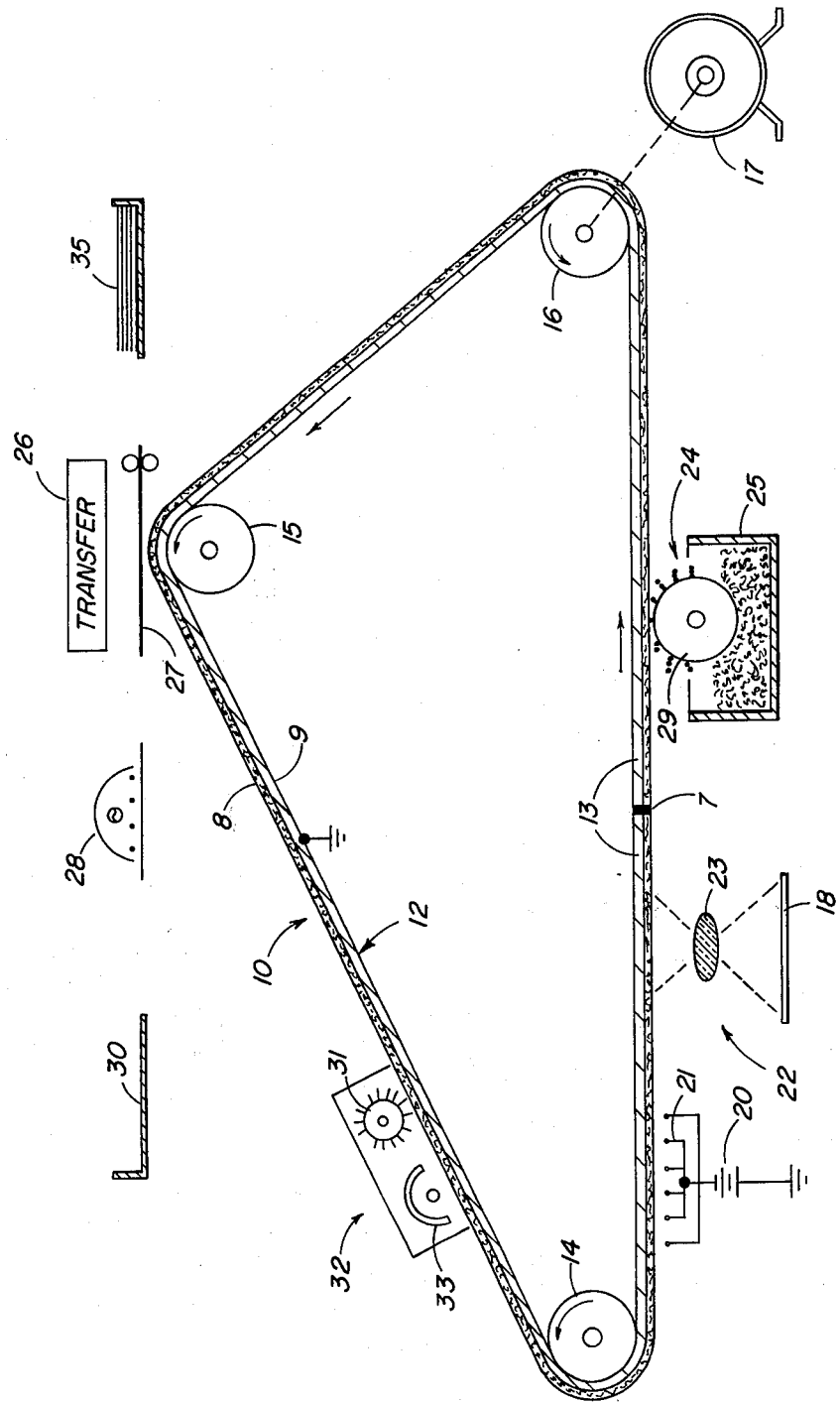
FIG. 1 is a schematic illustration of an electrophotographic copying machine in which the present invention is particularly useful.
Figure 2:
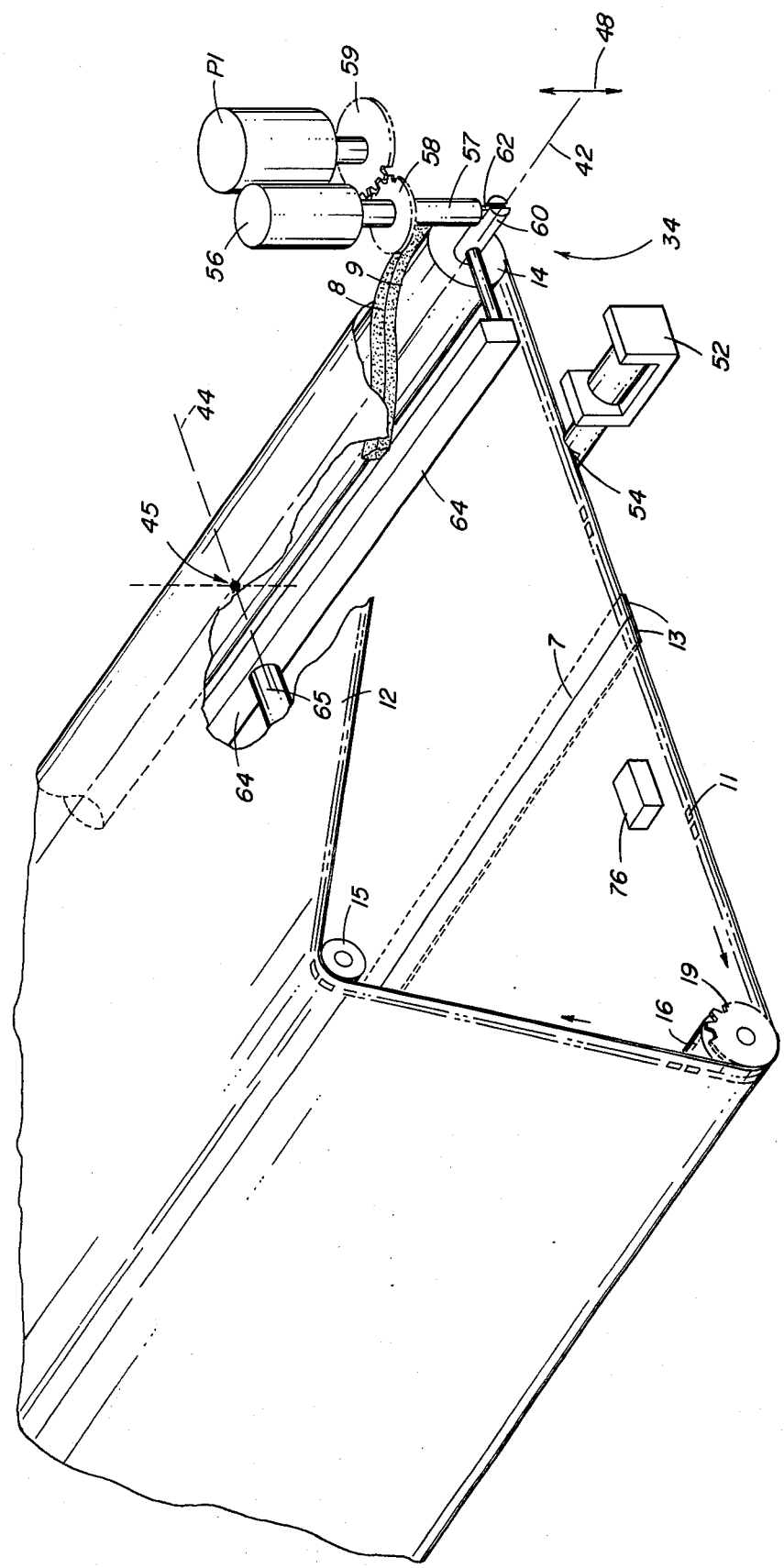
FIG. 2 is a perspective view of the mechanical components of a control apparatus constructed in accordance with a preferred embodiment of the invention.

Referring now to the drawing, and in particular FIG. 1, there is shown an electrophotographic copying mechanism 10 utilizing the invention of this application. The copying machine 10 includes a photoconductive belt or web 12, comprising a photoconductive insulating layer 8 and a conductive layer 9, whose ends 13 are spliced together, as indicated by reference number 7, to form an endless loop. The belt 12 is positioned about a steering roller 14, an idle roller 15 and a drive roller 16 which is coupled to a motor 17. As shown in FIG. 2, the drive roller 16 has a sprocket gear 19 connected to one end of its shaft which engages a series of sprocket holes 11 provided along an edge of the belt 12 for moving the belt along a predetermined path in the direction indicated by the arrows. Disposed along the path are the various electrophotographic stations which serve to reproduce a copy of an original document place on a viewing platen 18.

As the belt 12 passes charging station 20, its outer surface receives a uniform electrostatic charge from a corona source 21 or the like. Upon being uniformly charged, the belt 12 is advanced past an exposure station 22 where a radiation pattern of the original document positioned on the viewing platen 18 is projected onto the belt 12 by a lens system 23. This imagewise exposure of the belt serves to dissipate the uniform charge in the exposed areas thereof to form an electrostatic latent image corresponding to the indicia on the original document.

Development of the latent electrostatic image is accomplished as the belt 12 is advanced past the development station 24. The latter generally comprises a reservoir 25 containing a developer material, including toner particles of opposite charge to that of the latent electrostatic image, and means, such as a magnetic brush unit 29, for applying the developer material to such image whereby the toner particles adhere to the image, rendering the image visible.

In order to reuse that portion of the belt 12 bearing the toner image, the toner image is electrostatically transferred at a transfer station 26 from the photoconductive surface 8 to a paper receiver sheet 27 on which the toner image can be permanently fused. Such a transfer is commonly effected by feeding sheets of paper from a paper supply 35 to the transfer station 26 simultaneously with the passage therepast of the toner image. To synchronize the feeding of the paper receiver sheets with the movement of the photoconductive belt, and to control the timing of other electrophotographic operations, the sprocket holes 11 provided along an edge of the belt 12 are read by a sensing apparatus 76 (see FIG. 2) which produces a series of control signals which are in turn applied to a machine logic and control mechanism (not shown). An example of a logic and control mechanism which can perform the aforementioned operations is set forth in detail in coassigned, copending U.S. patent application Ser. No. 550,104 entitled SYNCHRONIZING CONTROL APPARATUS FOR ELECTROGRAPHIC APPARATUS USING DIGITAL COMPUTERS, filed in the names of Hunt et al. on Feb. 13, 1975, the disclosure of which is incorporated herein by reference.

To complete the reproduction cycle, the belt 12 is advanced from the transfer station past a cleaning station 32 where the belt surface is prepared for recycling by removal of any residual toner particles remaining thereon with a brush 31 and exposure to a light source 33 to discharge completely any residual charges.

After the toner image is transferred to the paper receiving sheet 27, the sheet is separated from the belt 12 and advanced past a fusing station 28 where the toner image is permanently fixed to the receiver sheet 27. After completion of the fusing operation station, the receiver sheet 27 is transported to an output receptacle 30.

As the photoconductive belt 12 and its subsequent replacements move past these processing stations, it is necessary to maintain the belt in a flat condition and in precise alignment with the stations. Any lateral displacement in the belt position can result in (1) nonuniform charging of the belt's photoconductive surface, (2) improper positioning and distortion of the image projected onto the photoconductive surface, (3) poor image development and transfer, and (4) miscounting of the belt perforations by the machine control logic. Such lateral displacement can also result in damage to the photoconductive belt itself.

Figure 3:
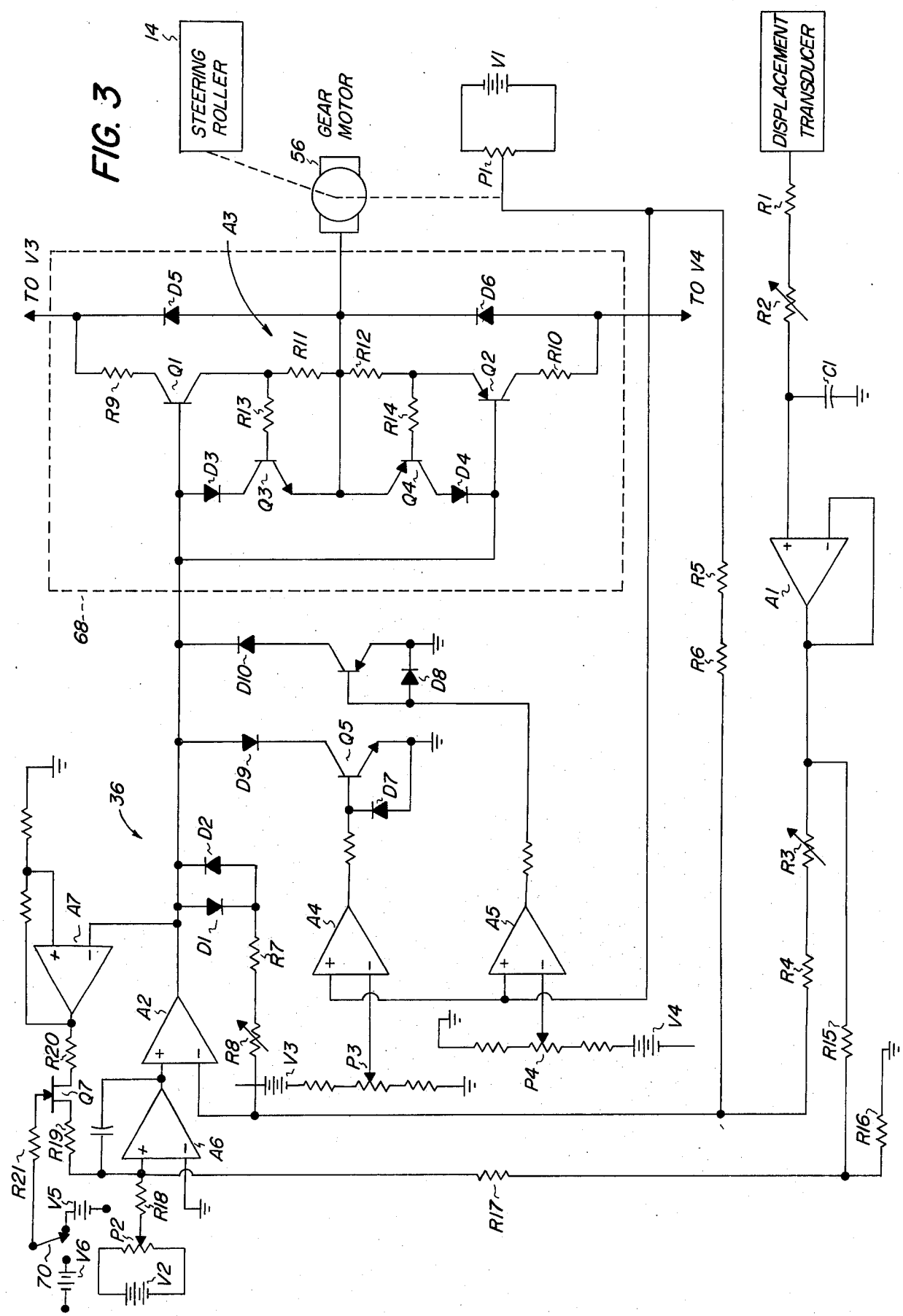
FIG. 3 is a schematic diagram of a circuit useful in connection with the apparatus of FIG. 2.
Figure 4:
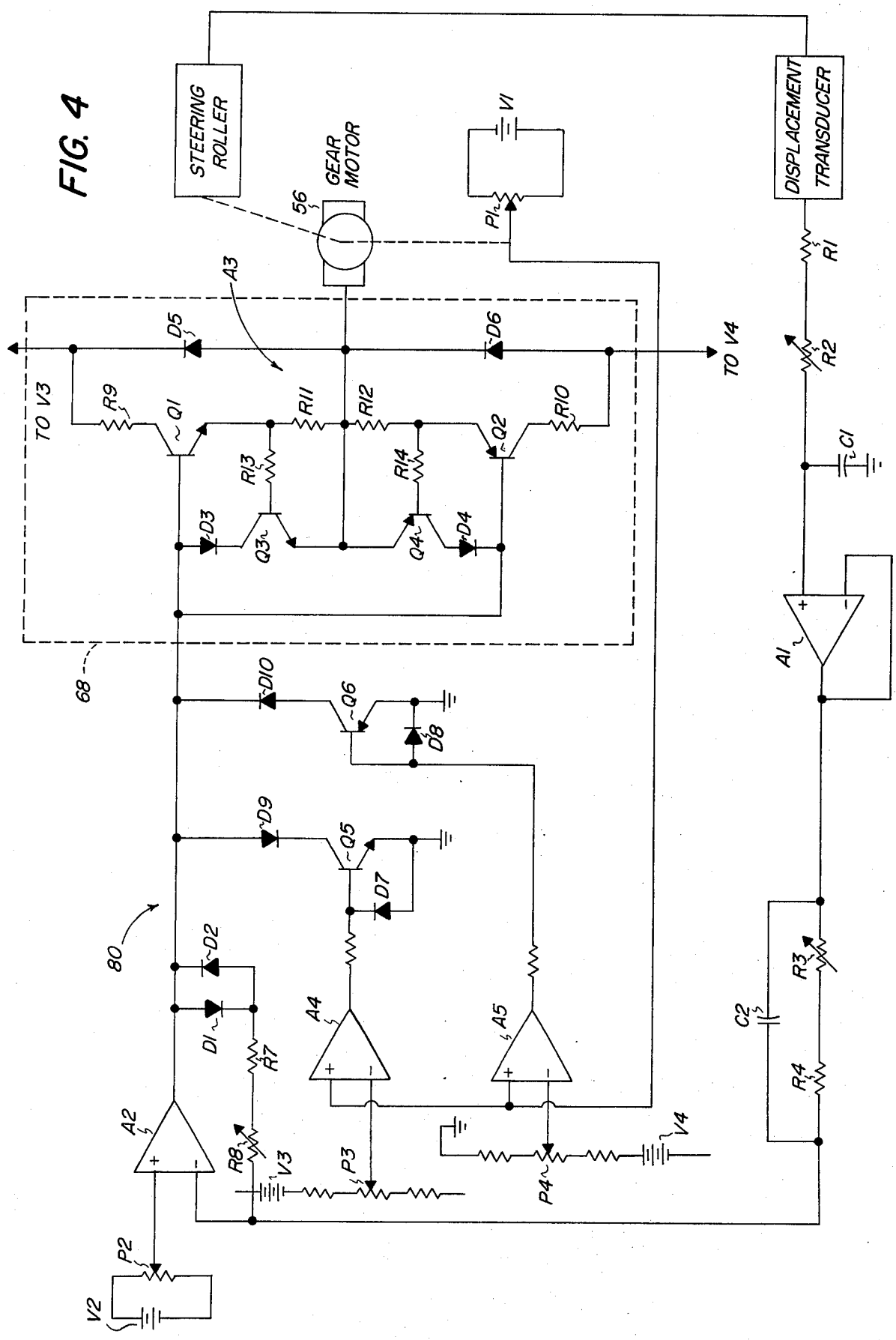
FIG. 4 is a schematic diagram of an alternative circuit useful in connection with the apparatus of FIG. 2.

Turning now to a description of the subject matter of the present invention, there is provided an improved tracking apparatus which continuously monitors the position of an endless belt and provides corrective action to maintain stable belt tracking along a desired path of movement. As shown in FIGS. 2, 3 and 4, the tracking apparatus comprises a belt steering roller assembly 34 and a control circuit 36 or, alternatively, the control circuit 80.

The belt steering roller assembly 34 includes the belt steering roller 14 which is mounted for rotation about a shaft 60. A gear motor 56 (manufactured by Portescap Corporation and designated Escap 26P) is fixedly mounted on a support frame (not shown) of the copying machine 10. The gear motor 56 is mechanically coupled to the wiper of a potentiometer P1 via mating gears 58 and 59 and coupled to the roller shaft 60 via a screw driver shaft 57 and linkage 62 which has one end secured to drive shaft 57 and its opposite end located in a slot provided in one end of the roller shaft 60. The bi-directional gear motor 56, through the screw drive shaft 57 and the linkage 62, varies the position of the end of the roller shaft 60 in either of two opposite directions as shown by the arrows 48. The opposite ends of shaft 60 are fixedly connected to a yoke 64. Yoke 64 in turn is mounted for pivotable rotation about a shaft 65 fixedly mounted on the support frame of the copying machine. The location of the shaft 65 is selected so that the yoke 64 permits the steering roller 14 to tilt about an axis 44 passing through the midpoint 45 of steering roller 14 perpendicular to the roller's longitudinal central axis 42. In response to a command signal from the control circuitry 36 or 80 indicative of lateral belt deviation from a predetermined tracking path, the gear motor 56 rotates the screw drive shaft 57 in either of two opposite directions, driving such shaft, the linkage 62 and the end of the roller shaft 60 in either of the two directions shown by the arrows 48, causing the steering roller 14 to tilt about the axis 44. The tilting movement of the steering roller 14 causes the belt 12 to be driven laterally, i.e., parallel to the central axis 42, in the direction opposite to the belt deviation.

The amount of adjustment to the position of steering roller 14 relative to the path of belt travel so as to track repeatedly the belt along the same, predetermined path of movement is preferably determined by the control circuitry 36 illustrated in FIG. 3. As best shown in FIG. 2, the control circuitry 36 includes a displacement transducer 52 (Model 7-DCDT-100 manufactured by Hewlett-Packard Co.) having a sensor 54 positioned to engage mechanically the edge of the belt 12. As the belt 12 passes over the steering roller 14, the lateral displacement of the belt is sensed by the sensor 54 which activates the transducer 52 to produce a DC voltage signal representative of the lateral belt edge position. The voltage output signal from the transducer 52 is fed through a fixed resistor R1, a variable resistor R2 and a capacitor C1 which function in combination as a low-pass filter, filtering out the high-frequency components of the signal produced by the transducer 52. This filtering reduces the extraneous corrective adjustment, and thus the vertical deviation of the steering roller 14, produced by the control circuitry 36 in response to uneven belt edges resulting from imperfect belt splitting or splicing operations. From the low-pass filter, the filtered belt edge position signal is fed to an amplifier A1 which functions as a high-input impedance buffer amplifier with unity gain. The output of the buffer amplifier A1 is fed through a series combination of a variable resistor R3 and a fixed resistor R4 to the negative input terminal of a summing amplifier A2.

Simultaneously with the production of the signal from the displacement transducer 52, another DC voltage signal is produced on the wiper of a potentiometer P1 connected across a voltage supply V1. As a result of the coupling of the wiper to the steering roller 14 through gear motor 56, the output signal produced by the potentiometer P1 is representative of the tilt angle of the steering roller 14. The output signal from the potentiometer P1 is fed through a series combination of a variable resistor R5 and fixed resistor R6 and is also applied to the negative input terminal of the summing amplifier A2. The resistors R3, R4, R5 and R6 function to give the signals from the displacement transducer 52 and potentiometer P1 the proper weight in the amplifier A2.

A portion of the output signal produced by the amplifier A1, obtained by a voltage divider comprising the resistors R15 and R16, is fed through a fixed resistor R17 and applied to the positive input terminal of an integrating amplifier A6. Also entering the positive input terminal of the integrating amplifier A6 is a command signal indicative of the desired belt displacement produced at the wiper of a potentiometer P2 connected across a voltage supply V2. In the embodiment shown, the operator of the machine manually adjusts the position of the potentiometer wiper to change the command signal. In other embodiments, the command signal can be controlled automatically by another circuit or another machine. During continuous machine operation, the amplifier A6 integrates the sum of the command signal and the portion of the filtered belt edge position signal derived from the amplifier A1, which sum is equal to the error in the belt edge position, and applies the resulting integral signal to the positive input terminal of the summing amplifier A2.

The summing amplifier A2 compares the weighted sum of the two signals from the displacement transducer 52 and the potentiometer P1 with the integrated signal produced by the amplifier A6. The difference in magnitude between these signals is amplified, with gain controlled by the series combination of a fixed resistor R7 and a variable resistor R8, producing a signal which is applied to the gear motor-drive amplifier designated generally by the reference numeral 68. The two diodes D1 and D2 connected between the output of amplifier A2 and the series combination of resistors R7 and R8 reduce the dead band in the input/output characteristic of the amplifier A2. The gear motor-drive amplifier 68 includes two power transistors Q1 and Q2 which comprise complementary amplifier A3. Transistors Q1 and Q2 are connected in an emitter follower configuration in order to provide the current gain necessary to drive the gear motor 56 and essentially unity voltage gain. The resistors R9 and R10 coupled to the collector of transistors Q1 and Q2, respectively, limit the voltage applied to the gear motor 56 to a safe value. The resistors R11 and R12 coupled to the emitters of transistors Q1 and Q2, respectively, function as output sensors, the voltage across which turns on transistors Q3 and Q4, respectively, when the output current approaches an unsafe value. The resistors R13 and R14 limit the base current into the transistors Q3 and Q4, respectively, to safe values. Diodes D3 and D4 are connected to the collectors of transistors Q3 and Q4 to prevent reverse current flow. The two diodes D5 and D6 connecting the gear motor 56 to the positive and negative voltage supplies V3 and V4, respectively, safely divert to such supplies any extraneous voltages produced by the gear motor 56 which exceed a predetermined magnitude.

A feedback path comprising amplifier A7, Field Effect Transistor (FET) Q7 and the resistors R19 and R20 is operative only during the times that the machine is energized but belt travel is stopped. During these times, a switch 70 is moved to the contact position, allowing a positive voltage from a supply V5 to be applied through a resistor R21 to the gate of the FET Q7, causing Q7 to conduct between its emitter and source, thus connecting the output of the amplifier A2 back through a high-gain amplifier A7 to the negative input terminal of amplifier A6. The effect of this connection is to force the output of amplifier A2 to zero, thus assuring no drive voltage to the gear motor 56 while the belt 12 is stopped. When the belt 12 is moving, the switch 70 is moved to the contact position, allowing a negative voltage from a supply V6 to be applied through the resistor R21 to the gate of the FET Q7 rendering it nonconductive, thus opening and rendering inoperative the feedback path used when the belt 12 is stopped.

To prevent the gear motor 56 from driving the steering roller 14 beyond the normal operating range, additional safeguards are provided. The signal from the wiper of potentiometer P1, which is proportional to the tilt angle of the steering roller 14, is compared in an amplifier A4 with an adjustable high-limit signal produced on the wiper of a potentiometer P3 and compared in an amplifier A5 with an adjustable low-limit signal produced on the wiper of a potentiometer P4. A signal from potentiometer P1 greater than the high-limit signal produced by potentiometer P3 causes amplifier A4 to turn on transistor Q5, thus essentially grounding the input to the gear motor-drive amplifier 58. A signal from the potentiometer P1 below the low-limit signal produced by potentiometer P4 causes amplifier A5 to turn on a transistor Q6 which also essentially grounds the input to the gear motor-drive amplifier 58. Two light-emitting diodes D9 and D10 turned on, respectively, by the transistors Q5 and Q6 provide a visual indication whenever the steering roller 14 has been driven to either of its two extreme positions. The diodes D7 and D8 connecting the base and emitter of transistors Q5 and Q6, respectively, prevent reverse current flow in the base-emitter junctions of the two transistors.

In operation, the integrating amplifier A6 continually integrates the sum of the command signal and a portion of the filtered belt edge position signal, producing a continuously adjusted output signal which is applied to the summing amplifier A2. Persistent deviations from zero of the sum the two input signals applied to the amplifier A6 will cause the output of the amplifier A6 to continue to build in magnitude, forcing the summing amplifier A2, which compares the continuously adjusted signal from the amplifier A6 with the weighted sum of the two signals from the displacement transducer 52 and the potentiometer P1, to apply a voltage signal to the gear motor 56 to steer the belt 12 until the sum of the two input signals to the amplifier A6 becomes zero, thus assuring tracking of the belt 12 in a single equilibrium position determined by the command signal.

In the alternative circuit 80 shown in FIG. 4, the output of the amplifier A1 which is representative of the lateral belt edge position is fed through the series resistors R3 and R4 to the summing amplifier A2 as before. However, the feedback signal from the potentiometer P1 to the negative input terminal of the summing amplifier A2 is eliminated. A derivative feedback of the lateral belt edge position is provided by connecting a capacitor C2 between the output of amplifier A1 and the negative input terminal of the summing amplifier A2. The derivative feedback provides a signal representative of the instantaneous belt deviation rate. The belt deviation rate signal is combined with the weighted lateral belt edge position signal and then applied to the negative input terminal of the summing amplifier A2. The command signal representative of this desired lateral belt displacement is produced at the wiper of the potentiometer P2 connected across the voltage supply V2 and applied to the positive input terminal of the amplifier A2. The summing amplifier A2 compares the sum of the two signals from the capacitor C2 and the amplifier A1 with the command signal. The output of the amplifier A2, which is the difference in magnitude between the aforementioned signals, is then processed in the manner previously described in connection with the circuit 36 to apply a control signal to the gear motor 56.

In summary, with a fixed command signal, the apparatus of the invention provides stable tracking in the same equilibrium path for a variety of imperfect endless belts, producing fairly rapid and well-damped adjustments when either the command signal is changed or belt position disturbances occur. During steady-state operating conditions, using a 10-inch-long steering roller 14, a 10-inch-wide photoconductive belt 12, slit and spliced in the usual manner, and the circuitry 36 shown in FIG. 3, the ends of the steering roller 14 oscillate with a magnitude of about 50 microns peak to peak. The belt-to-belt variation in the average steering roller end displacement is less than 400 microns. As a result, side-to-side variations in charging of the photoconductive belt 12 due to steering roller tilt are no longer observable and sensing of the perforations 11 in the belt 12 by the sensing apparatus 76 is more accurate. Comparable results were also achieved using a 15-inch-wide belt 12 and a 15-inch-long steering roller 14.

The invention has been described in detail with reference to a preferred embodiment thereof, but it will be understood that variations and modifications can be effected within the spirit and scope of the invention.

What is claimed is:

1. A control apparatus for tracking an endless belt of material in a predetermined path of movement comprising:
   a. a belt steering roller for supporting said belt, said roller being adapted for rotational movement about a first central axis and tilting movement about a second axis extending through the midpoint of said roller and perpendicular to said first axis;
   b. means connected to said roller for tilting said roller about said second axis in each of two opposite directions;
   c. means for sensing the lateral position of said belt and for producing a first electrical signal representative thereof;
   d. means for producing a second electrical signal representative of a desired lateral belt position;
   e. means for sensing the tilt position of said roller and for producing a third electrical signal representative thereof; and
   f. means for processing said first, second and third signals and for applying to said tilting means a steering roller control signal which compensates for changes in the shape of said belt, said control signal adjusting the position of said tilting means so that said belt repeatedly tracks in said predetermined path of movement, said processing means including means for comparing the magnitude of the weighted sum of said first and third signals with the magnitude of the integrated sum of said first and second signals to produce said control signal, said control signal being proportional to the difference in magnitude between such compared signals.

2. A control apparatus for tracking an endless belt of material in a predetermined path of movement comprising:
   a. a belt steering roller for supporting said belt, said roller being adapted for rotational movement about a first central axis and tilting movement about a second axis extending through the midpoint of said roller and perpendicular to said first axis;

b. means connected to said roller for tilting said roller about said second axis in each of two opposite directions;

c. means for sensing the lateral position of said belt and for producing a first electrical signal representative thereof;

d. means for producing a second electrical signal representative of the lateral belt deviation rate;

e. means for producing a third electrical signal representative of a desired lateral belt position; and f. means for comparing the magnitude of the weighted sum of said first and second signals with the magnitude of said third signal to produce a control signal which compensates for disturbing forces affecting the belt deviation rate and changes in the tilt position of said roller and for applying said control signal to said tilting means.

3. The apparatus according to claim 2 further including:

a. means for sensing the tilt position of said roller and for producing a fourth electrical signal representative thereof;

b. means for providing high and low limit signals; and c. means for comparing said fourth electrical signal with said limit signals and for disengaging said tilting means whenever said fourth electrical voltage signal is greater than said high-limit signal or less than said low-limit signal.

4. Control apparatus for tracking an endless belt of material in a predetermined path of movement comprising:

a. a steering roller for supporting said belt, said roller being adapted for rotational movement about a first, central axis and tilting movement about a second axis extending through the midpoint of said roller and perpendicular to said first axis;

d. motor means connected to said roller for tilting said roller about said second axis in each of two opposite directions;

c. a displacement transducer positioned to sense the edge of said belt and adapted to produce a first voltage signal representative of the lateral position of said belt edge;

d. means for producing a second voltage signal representative of the tilt position of said roller;

e. means for producing a third voltage signal representative of a desired lateral belt position;

f. an integrating amplifier for integrating the sum of said first and third signals and for producing a fourth voltage signal representative thereof;

g. a summing amplifier for comparing the weighted sum of said first and second voltage signals with said fourth voltage signal and for producing an output signal proportional to the difference in magnitude between such compared signals; and h. means responsive to said output signal for controlling the energization of said motor means.

5. The apparatus according to claim 4 further including means for filtering the high-frequency components of said first voltage signal and means for comparing said second voltage signal with adjustable high- and low-limit signals, respectively, and for inactivating said motor means whenever said second voltage signal is greater than said high-limit signal or less than said low-limit signal.

6. The apparatus according to claim 4 further including means for forcing the output of said summing amplifier to zero during the periods when said control apparatus is energized but the movement of said belt is stopped.

7. Control apparatus for tracking an endless belt of material in a predetermined path of movement comprising:

a. a steering roller for supporting said belt, said roller being adapted for rotational movement about a first, central axis and tilting movement about a second axis extending through the midpoint of said roller and perpendicular to said first axis;

b. a bi-directional gear motor having a rotatable screw drive shaft mechanically connected to said roller for tilting said roller about said second axis in each of two opposite directions;

c. a displacement transducer positioned to sense the edge of said belt and adapted to produce a first voltage signal representative of the lateral position of said belt edge;

d. means for producing a second voltage signal representative of the lateral belt deviation rate;

e. means for producing a third voltage signal representative of a desired lateral belt position;

f. a summing amplifier for comparing the weighted sum of said first and second voltage signals with said third voltage signal and for producing an output signal proportional to the difference in magnitude between such compared signals; and g. motor-drive means responsive to said output signal for controlling the energization of said gear motor.

8. The apparatus according to claim 7 further including a potentiometer mechanically coupled to said gear motor and adapted to produce a fourth voltage signal representative of the tilt position of said roller and means for comparing said fourth voltage signal with adjustable high- and low-limit signals, respectively, and for diengaging said gear motor whenever said fourth voltage signal is greater than said high-limit signal or less than said low-limit signal.

9. A control apparatus for tracking an endless belt of material in a predetermined path of movement comprising:

a. a belt steering roller for supporting said belt, said roller being adapted for rotational movement about a first central axis and tilting movement about a second axis extending through the midpoint of said roller and perpendicular to said first axis;

b. means connected to said roller for tilting said roller about said second axis in each of two opposite directions;

c. means for sensing the lateral position of said belt and for producing a first electrical signal representative thereof;

d. means for producing a second electrical signal representative of a desired lateral belt position;

e. means for sensing the tilt position of said roller and for producing a third electrical signal representative thereof;

f. means for processing said first and second signals and for applying to said tilting means a steering roller control signal which compensates for changes in the shape of said belt, said control signal adjusting the position of said tilting means so that said belt repeatedly tracks in said predetermined path of movement; and g. means for providing high and low limit signals and means for comparing said third electrical signal with said limit signals and for disengaging said tilting means whenever said third voltage signal is geater than said highlimit signal or less than said low-limit signal.

* * * * *